United States Patent [19]

Bartilson

[11] Patent Number: 5,114,448
[45] Date of Patent: May 19, 1992

[54] AIR FILTERING APPARATUS

[75] Inventor: Bradley W. Bartilson, Chippewa Falls, Wis.

[73] Assignee: Cray Research, Inc., Eagan, Minn.

[21] Appl. No.: 773,148

[22] Filed: Oct. 8, 1991

[51] Int. Cl.⁵ .............................................. B01D 46/00
[52] U.S. Cl. .................................... 55/491; 55/497; 55/505; 55/521; 55/525; 55/DIG. 31; 55/DIG. 42
[58] Field of Search ................. 55/491, 493, 495, 505, 55/506, 508, 521, 525, DIG. 31, DIG. 42

[56] References Cited

U.S. PATENT DOCUMENTS

| | | | |
|---|---|---|---|
| 2,175,903 | 10/1939 | Lichtman | 55/491 |
| 3,017,698 | 1/1962 | Hambrecht et al. | 55/DIG. 31 X |
| 3,019,854 | 2/1962 | O'Bryant | 55/491 |
| 3,149,942 | 9/1964 | Finch | 55/DIG. 42 X |
| 4,088,463 | 5/1978 | Smith | 55/505 X |
| 4,178,161 | 12/1979 | Rudner et al. | 55/521 X |

Primary Examiner—Charles Hart
Attorney, Agent, or Firm—Merchant, Gould, Smith, Edell, Welter & Schmidt

[57] ABSTRACT

A high reliability, non-blocking air filter for filtering large volumes of low pressure air from equipment to be maintained free of dust and impurities while being ventilated during operation is disclosed. The filter media is mounted in a frame having a U-shaped cross section construction, which is attached over an air intake opening of the piece of equipment. The filter media includes a planar base surface and a plurality of projections. The tops of the projections define a surface above said planar base surface for supporting free-flowing articles so as such that these articles do not obstruct the air flow through the air intake filter.

9 Claims, 4 Drawing Sheets

AIR FILTERING APPARATUS

FIELD OF THE INVENTION

The present invention relates to a highreliability, non-blocking air filter and, more particularly, to an air filter for filtering large volumes of low pressure air.

BACKGROUND OF THE INVENTION

The invention relates to an air filter for use on equipment requiring ventilation free of dust and other impurities during operation. One type of equipment requiring such a filter are computer cabinets, where the constant circulation of cool air is essential due to the heat generated during operation.

Prior art air filters are typically constructed with a media having a flat, planar surface. However, this construction has serious disadvantages in environments where large volumes of low pressure air are circulated. Under these conditions, free-flowing articles, such as paper, can be drawn against the filter media and prevents air from ventilating through the filter. Without sufficient air flow, electronic equipment, such as computers, will overheat, causing damage to the equipment and creating a potential fire hazard. As a result, air flow through cooling/ventilation systems must be constantly monitored for obstructions.

The present invention provides a high reliability, non-blocking air filter which is capable of functioning in the presence of large volumes of low pressure air, without the need for monitoring air flow.

SUMMARY OF THE INVENTION

According to the present invention, there is provided an high reliability, non-blocking air filter. The air filter comprises a filter media having a plurality of projections which significantly reduce, and preferably eliminate, the problem of blocking. The filter includes a media mounted within a frame which attaches to the air inlet of a computer, or like equipment. The frame is fastened over the air inlet. A rigid grate or mesh is located in the frame and is held in place by the filter media. The filter media is constructed with a plurality of projections on the air intake side of the air intake filter. The tops of the projections define a surface for supporting free-flowing articles which might otherwise be drawn against the filter media.

In operation, free-flowing articles, such as paper, are drawn up against the filter media and supported by the surface defined by the projections. The filter remains open because the projections define a space between the article and the intake surface of the filter through which air can continue to move. As a result, the filter's flow rate does not substantially decrease when a potential obstructions is drawn to the surface of the filter media.

These and other advantages of the present invention will become apparent with reference to the accompanying drawings, detailed description of the preferred embodiment and claims. While the foregoing is a description of the preferred embodiment of the present invention, it is nevertheless not intended to be limited to the details shown, since various modifications and structural changes may be made therein without departing from the spirit of the invention and within the scope and range of equivalents of the claims.

BRIEF DESCRIPTION OF THE DRAWINGS

The invention is further explained with reference to the drawings in which.

DETAILED DESCRIPTION OF THE PREFERRED EMBODIMENT

Figure 1:
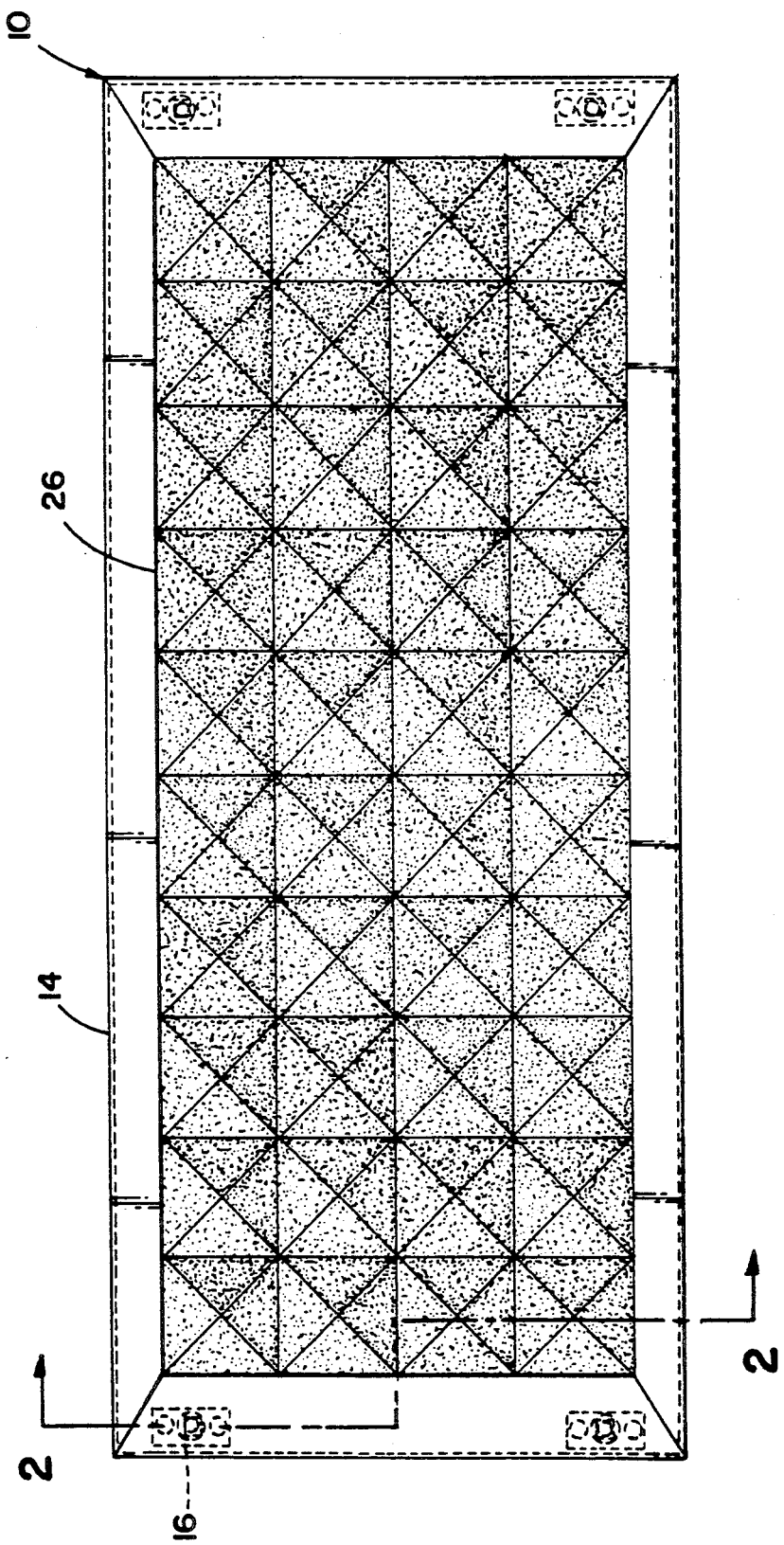
FIG. 1 is a front view of the air filter apparatus of the present invention.

FIG. 1 is a front view of the air intake filter 10 of the present invention. The air intake filter 10 mounts over a cabinet air intake (not shown) by way of speed clip spring catchers 16 attached to the frame 14, so that a filter media 26 substantially covers the opening in the cabinet.

Figure 2:
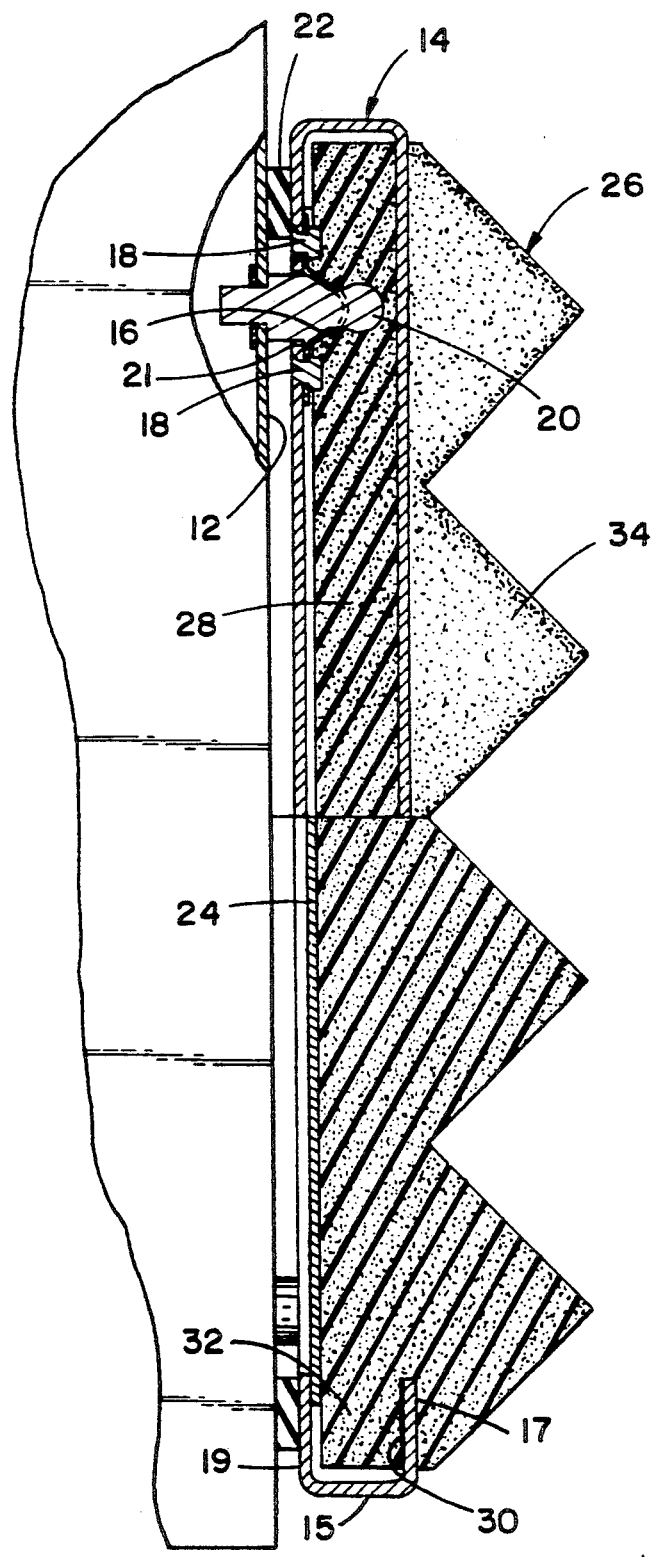
FIG. 2 is a cut away section of the air filter apparatus of FIG. 1, shown attached over a cabinet air intake.

FIG. 2 is a cut away section of the air intake filter 10 of the present invention, shown mounted over a cabinet air intake 12. A frame 14 for the air intake filter 10 is manufactured from stainless steel bent into a "U" shape. The "U" shaped frame 14 members have a generally planar bottom 15 with a pair of upright members which form the front wall 17 and back wall 19 of the frame 14. The frame 14 members are oriented to define a channel 32 on the inside perimeter of the frame, which receives the steel mesh 24 and filter media 26, as discussed in detail below. The frame 14 members are joined together forming a substantially rectangular shape.

Speed clip spring catchers 16 are mounted over holes 21 in the back wall 19 of the frame 14 by pop rivets 18. Mating speed clip fasteners 20 is attached to the outside surface of the cabinet air intake 12 at locations which correspond to the location of the speed clip spring catchers 16 on the frame 14. A gasket 22 is interposed between the back wall 19 of the frame 14 and the cabinet air intake 12. The gasket 22 in the preferred embodiment of the present invention is a vinyl adhesive-backed foam tape affixed around the perimeter of the frame 14 on the back wall 19.

Figure 5:
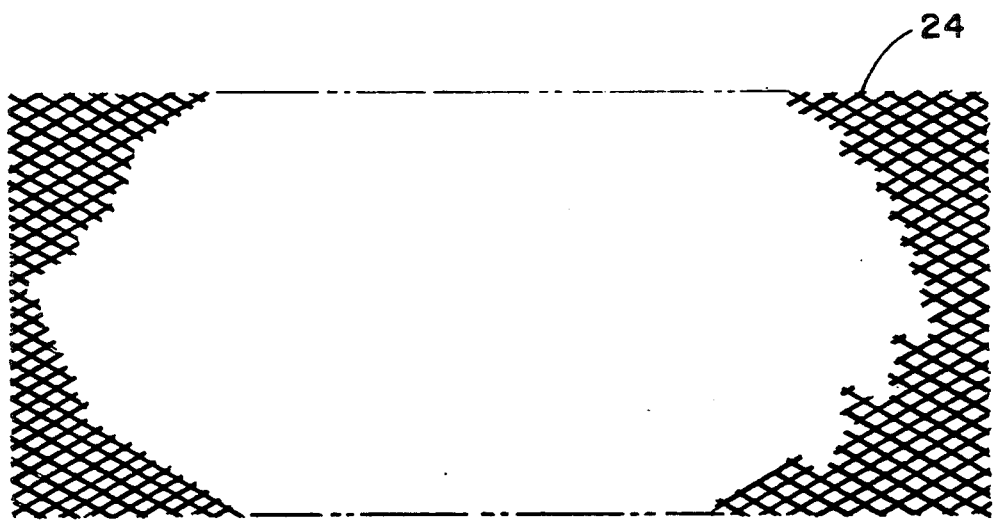
FIG. 5 is a front view of the steel mesh which supports the filter media of the present invention.

A stainless steel mesh 24, shown in detail in FIG. 5, is inserted into the channel 32 of the frame 14. The outside dimensions of the mesh 24 are larger than the opening in the cabinet air intake 12, but smaller than the inside dimensions of the channel 32. The mesh 24 contacts the inside surface of the back wall 19 of the frame 14, providing structural support for the filter media 26. In the preferred embodiment of the present invention, the steel mesh 24 is constructed of stretched stainless steel. However, one skilled in the art will know that the steel mesh 24 may be constructed from a variety of materials.

Filter media 26 has a planar base 28 with a slit 30 extending around the perimeter. The planar base 28 of the filter media 26 can be deformed for insertion into the frame 14 so that the slit 30 engages with the front wall 17 of the frame 14.

Although the projections also perform a filtering function, most of the filtering is accomplished by the planar base 28. Consequently, the filter media 26 contains a series of projections 34 which face away from the cabinet air intake 12. The tops of these projections define a surface which serves to prevent free-flowing articles from obstructing the air flow through the planar base 28.

Figure 4:
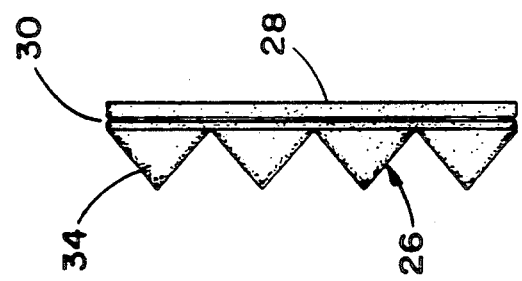
FIGS. 3 and 4 are a front and side view, respectively, of the filter media of the present invention.
Figure 3:
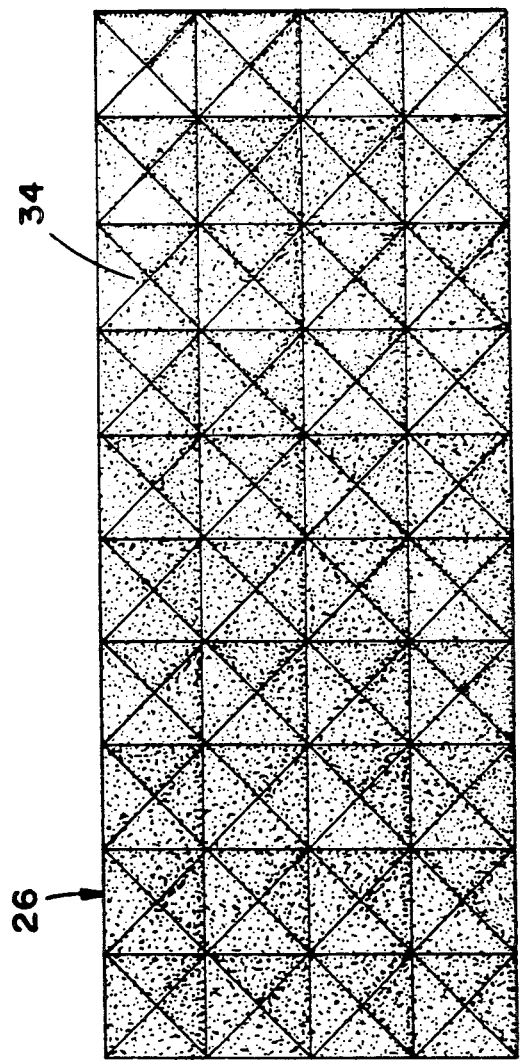

FIGS. 3 and 4 illustrate the front and side views of the filter media 26 of the present invention. As discussed above, the slit 30 extends around the perimeter of the planar base 28 for engaging with the front wall 17 of the frame 14. While the projections 34 of the present invention are four-sided pyramid structures, it will be recognized that a variety of geometric shapes would achieve the results intended in the present invention. For example, cone-shaped projections would achieve the same result.

Finally, FIG. 5 illustrates the stainless steel mesh of the present invention. The stainless steel mesh 24 serves to provide structural support for the filter media 26 and to prevent objects with large mass from displacing the filter media 26 and penetrating the cabinet air intake 12.

While a particular embodiment has been described, it will be appreciated that modifications can be made without departing from the scope of the invention as defined in the appended claims. In particular, the projections 34 on the filter media 26 can be configured in a variety of shapes. Further, the frame 14 can be designed to cover non-rectangular cabinet air intakes.

I claim:

1. A high reliability, non-blocking air filter for filtering large volumes of low pressure air comprising:
   (a) a frame having first and second pairs of oppositely disposed U-shaped frame members joined together to form a substantially rectangular shape, the bottom side of said U-shaped frame members defining the outside perimeter of said frame and the sides of said U-shaped members defining front and back walls of said frame, whereby a channel is defined on the inside perimeter of said frame;
   (b) a rigid grill inserted in said U-shaped channel contacting the inside surface of said back wall of said frame; and
   (c) a filter media having a substantially planar surface on a first surface and a plurality of projections on the opposite surface, said projections defining a space therebetween, and a slit around the perimeter of said first planar surface for mating with said front wall of said frame.

2. An air filter in accordance with claim 1 wherein said frame further includes fastening means located on the outside surface of said back wall of said frame for fastening said frame to another surface.

3. An air filter in accordance with claim 2 wherein said fastening means includes a clip-spring catch attached to the back wall of said frame.

4. An air filter in accordance with claim 1 wherein said first planar surface of said filter media extends substantially to the inside surface of said bottom side of said U-shaped frame members.

5. An air filter in accordance with claim 1 wherein the tops of said projections of said filter media define a surface lying above said planar base for suspending free-flowing articles away from said planar base.

6. An air filter in accordance with claim 1 wherein said projections of said filter media provide define a space for ventilating air therethrough when freeflowing articles contact the tops of said projections.

7. An air filter in accordance with claim 1 wherein said projections are in the form of pyramids.

8. An air filter in accordance with claim 1 wherein said projections are in the form of cones.

9. An air filter in accordance with claim 1 wherein said grill is constructed of stretched stainless steel.

* * * * *

UNITED STATES PATENT AND TRADEMARK OFFICE
CERTIFICATE OF CORRECTION

PATENT NO. : 5,114,448

DATED : May 19, 1992

INVENTOR(S) : Bradley W. Bartilson

It is certified that error appears in the above-identified patent and that said Letters Patent is hereby corrected as shown below:

On the Title page, item [57], in the abstract, line 6, delete "cross section" and insert --cross-section-- therefor.

In column 1, line 6, delete "highreliability" and insert --high reliability-- therefor.

In column 1, line 37, delete "an" and insert --a-- therefor.

In column 1, line 57, delete "obstructions" and insert --obstruction-- therefor.

In column 2, line 36, delete "is" and insert --are-- therefor.

In column 4, line 26, insert --and-- after the word "provide".

In column 4, line 27, delete "freeflowing" and insert --free-flowing-- therefor.

Signed and Sealed this

Tenth Day of August, 1993

Attest:

MICHAEL K. KIRK

*Attesting Officer*  *Acting Commissioner of Patents and Trademarks*